(12) United States Patent
Okuno et al.

(10) Patent No.: US 6,763,194 B2
(45) Date of Patent: Jul. 13, 2004

(54) OPTICAL TRANSMISSION SYSTEM AND CHANNEL ASSIGNING METHOD

(75) Inventors: Toshiaki Okuno, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 590 days.

(21) Appl. No.: 09/757,580

(22) Filed: Jan. 11, 2001

(65) Prior Publication Data
US 2001/0008453 A1 Jul. 19, 2001

(30) Foreign Application Priority Data
Jan. 13, 2000 (JP) .................................... P2000-004680

(51) Int. Cl.[7] .................................................. H04J 14/02
(52) U.S. Cl. ........................... 398/83; 398/82; 398/85; 398/92; 398/157
(58) Field of Search ................................ 398/82–83, 79, 398/85, 92, 157

(56) References Cited

U.S. PATENT DOCUMENTS

| | | | |
|---|---|---|---|
| 5,657,406 A | * | 8/1997 | Ball ............................ 385/24 |
| 6,115,158 A | * | 9/2000 | Kaneko ........................ 398/79 |
| 6,493,117 B1 | * | 12/2002 | Milton et al. ................. 398/49 |
| 6,567,197 B1 | * | 5/2003 | Glance ........................ 398/82 |

FOREIGN PATENT DOCUMENTS

| JP | 7-177097 | 7/1995 |
|---|---|---|
| JP | 7-231300 | 8/1995 |

* cited by examiner

Primary Examiner—Kinfe-Michael Negash
(74) Attorney, Agent, or Firm—McDermott Will & Emery LLP

(57) ABSTRACT

The present invention relates to an optical transmission system and a channel assigning method with structure to reduce dispersion of power levels among signals dropped at respective signal branchpoints on an optical transmission line out of signals of multiple channels amplified in an optical amplifier. The optical transmission system has an optical transmission line in which signals of multiple channels propagate, an optical amplifier provided on the transmission line, and a plurality of signal branchpoints disposed on the downstream transmission line in which the signals of the channels outputted from the optical amplifier propagate. Each of the signal branchpoints drops a signal of a channel with a lowest power level out of arriving signals in the channels. This reduces the dispersion of power levels among signals dropped at the respective branchpoints, as a whole of the optical transmission system.

8 Claims, 7 Drawing Sheets

OPTICAL TRANSMISSION SYSTEM AND CHANNEL ASSIGNING METHOD

BACKGROUND OF THE INVENTION

1. Field of the Invention

The present invention relates to an optical transmission system of the wavelength division multiplexing (WDM) method (which will be referred to hereinafter as a WDM transmission system) for transmitting signals of multiple channels (of respective wavelengths different from each other), having an optical amplifier, and to a channel assigning method of determining channels to be added or dropped at respective nodes.

2. Related Background Art

From the social needs with arrival of advanced information society, research and development has actively been conducted on long-haul optical communications including large-capacity and high-speed optical communications such as picture communications or the like, internal communications, etc. using optical fiber transmission networks. Here the WDM transmission systems are systems that implement large-capacity and high-speed optical communications by transmitting signals of multiple channels (which are signals of mutually different wavelengths and which will be referred to hereinafter as WDM signals) through optical fiber lines, and they have been developed and introduced so as to be ready for quickly increasing demands for communications making use of the internet and others in recent years.

In such WDM transmission systems, an optical amplifier, such as an Er(erbium)-doped fiber amplifier (EDFA: Erbium-Doped Fiber Amplifier), is utilized in order to compensate for transmission losses produced during signal transmission over long distance in the multiple channels. The optical amplifier is an optical device that supplies pumping light of a predetermined wavelength to an optical waveguide doped with such a rare earth as Tm, Pr, Nd, or the like, as well as above Er, (for example, an Er-doped optical fiber, EDF: Erbium-Doped Fiber) to amplify signals entering this optical waveguide. Semiconductor optical amplifiers are also employed as such optical amplifiers.

SUMMARY OF THE INVENTION

The inventors have investigated the prior arts described above and found the following problems. As the WDM transmission systems there are multidrop systems that transmit the WDM signals of mutually different wavelengths in an optical transmission line while adding or dropping part of the WDM signals at every node (signal add point or signal drop point) located on the optical transmission line. The conventional phototransmission systems of the multidrop type and assignment of signal channels to be added or dropped are described, for example, in Japanese Patent Applications Laid-Open No. H07-177097, Laid-Open No. H07-231300, and so on.

When the optical amplifier is set on the transmission line of the WDM transmission system of this multidrop type, a plurality of signal branchpoints are installed on the transmission line located on the output side of the optical amplifier. At each signal branchpoint, part of the WDM signals amplified by the optical amplifier (e.g., a signal of a channel to be dropped) is branched into a branch line. At this time, attenuation of each WDM signal propagating in the transmission line is dependent upon a transmission distance and attenuation values of the respective WDM signals differ from each other, depending upon installation locations of the respective signal branchpoints from the optical amplifier.

Here an amplification gain of the optical amplifier demonstrates wavelength dependence in general. If the gain is controlled so as to keep power levels of output signals constant (constant output), there will be a possibility of causing dispersion of power levels of signals dropped at the respective signal branchpoints, because of the aforementioned difference between the transmission losses of near signal branchpoints and far signal branchpoints from the optical amplifier.

On the other hand, it is also possible to reduce the dispersion of power levels of signals dropped at the signal branchpoints, by controlling the amplification gain of the optical amplifier so that a certain slope is preliminarily given to a gain curve demonstrating the wavelength dependence of gain. However, such control of amplification gain will complicate the device configuration of the optical amplifier and increase manufacturing cost of the optical amplifier.

The present invention has been accomplished in order to solve the above problems and an object of the present invention is to provide an optical transmission system provided with a structure for reducing the dispersion of power levels of signals dropped at the respective signal branchpoints located on the downstream transmission line from the optical amplifier, and also to provide a channel assigning method of assigning channels to be dropped, to the respective signal branchpoints.

An optical transmission system according to the present invention comprises an optical transmission line in which signals of multiple channels of mutually different wavelengths included in a predetermined wavelength band propagate, an optical amplifier disposed on the transmission line and having a gain depending on wavelength, and a plurality of signal branchpoints disposed on the output terminal side of the optical amplifier in the transmission line. Particularly, the optical transmission system according to the present invention is characterized in that each of the signal branchpoints drops a signal of a channel with a lowest power level out of the signals of the multiple channels arriving thereat, in order to accomplish the above object. A channel assigning method of the present invention for assigning channels to be dropped, to respective signal branchpoints, comprises steps of successively selecting one of the signal branchpoints, specifying a channel with a lowest power level out of the channels, for every signal branchpoint thus selected, and preliminarily or dynamically assigning the channel thus specified, to the selected signal branchpoint, as a channel of a signal to be dropped.

The inventors focused attention on the fact that the gain of the optical amplifier such as the EDFA applied to the optical transmission systems had the wavelength dependence, and discovered that it was possible to reduce the dispersion of power levels of dropped signals at the respective signal branchpoints placed on the transmission line in which the amplified signals propagated, by making use of correlation between transmission distances and the gain curve demonstrating the wavelength dependence. Namely, as the distance of a signal branchpoint increases from the optical amplifier, the power level of a signal to be dropped at the signal branchpoint becomes lower because of the transmission loss. To overcome it, the optical transmission system and the channel assigning method according to the present invention are arranged to set or select a wavelength of a signal with a lowest power level immediately before dropping out of signals arriving at each signal branchpoint after passage through other signal branchpoints present between the signal branchpoint of interest and the optical amplifier, as a wavelength of a signal to be dropped at the signal branchpoint.

Since the signals of the channels amplified by the optical amplifier uniformly attenuate while propagating in the transmission line on the output terminal side of the optical amplifier, the signals are dropped in order from the output signal with the lowest power level at the output terminal of the optical amplifier. This means that an output signal with a higher power level is set to have a longer transmission distance before dropping (or to have a greater transmission loss). This reduces the dispersion of signal power levels among dropped channels at low cost and readily with making use of the gain curve of the optical amplifier as it is, and without complicating the structure of the optical transmission system and the device configuration of the optical amplifier. In the case wherein signals of plural channels are dropped at one signal branchpoint, the system and method can be arranged so that one of the channels to be dropped is the one with the lowest signal power level as described above.

It is preferable here that each signal branchpoint include either of an optical ADM (Add-Drop Multiplexer) and a WDM coupler. The optical ADM is a branching device with excellent wavelength selectivity, which can adequately suppress crosstalk between signal channels, even if wavelength spacings are narrow between signal channels. The WDM coupler is compact, inexpensive, and easy to handle, and less attenuates signals.

Further, each signal branchpoint may include an optical coupler and a band-pass filter. The optical coupler is compact, inexpensive, and easy to handle and thus is effective to such circumstances that the number of signal channels is not so large and the system configuration is desired to be especially simple. When the band-pass filter is of a variable type, degrees of freedom can be increased for modification of the system.

Particularly, when each signal branchpoint includes a variable band-pass filter, it becomes feasible to select branch channels at respective signal branchpoints, or to centralize assignment of branch channels to the respective signal branchpoints (or implement dynamic assignment of branch channels).

When a branch channel is selected at each signal branchpoint, the signal branchpoint is preferably provided with a local control system. This local control system monitors power levels of signals arriving in respective channels and then specifies a channel with a lowest power level out of the channels, as a channel of a signal to be dropped thereat.

When the branch channels are assigned to the respective signal branchpoints in centralized manner, the optical transmission system is preferably provided with a centralized control system for assigning channels to be dropped, to the respective signal branchpoints while monitoring power levels of signals arriving in respective channels at the respective signal branchpoints. This centralized control system selects a signal branchpoint as a control objective out of a plurality of signal branchpoints and specifies, for every signal branchpoint selected, a channel with a lowest power level out of the channels, as a channel of a signal to be dropped at the signal branchpoint selected.

The optical amplifier is preferably an Er-doped fiber amplifier (EDFA). Since the channel assigning method according to the present invention makes use of the wavelength dependence without provision of a device configuration for flattening the gain curve of the EDFA, it becomes feasible to reduce the dispersion of power levels of signals dropped at the respective signal branchpoints while adequately controlling the manufacturing cost in a reasonable range. The optical amplifiers except for the above can also be applied similarly to the optical transmission system and channel assigning method according to the present invention.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
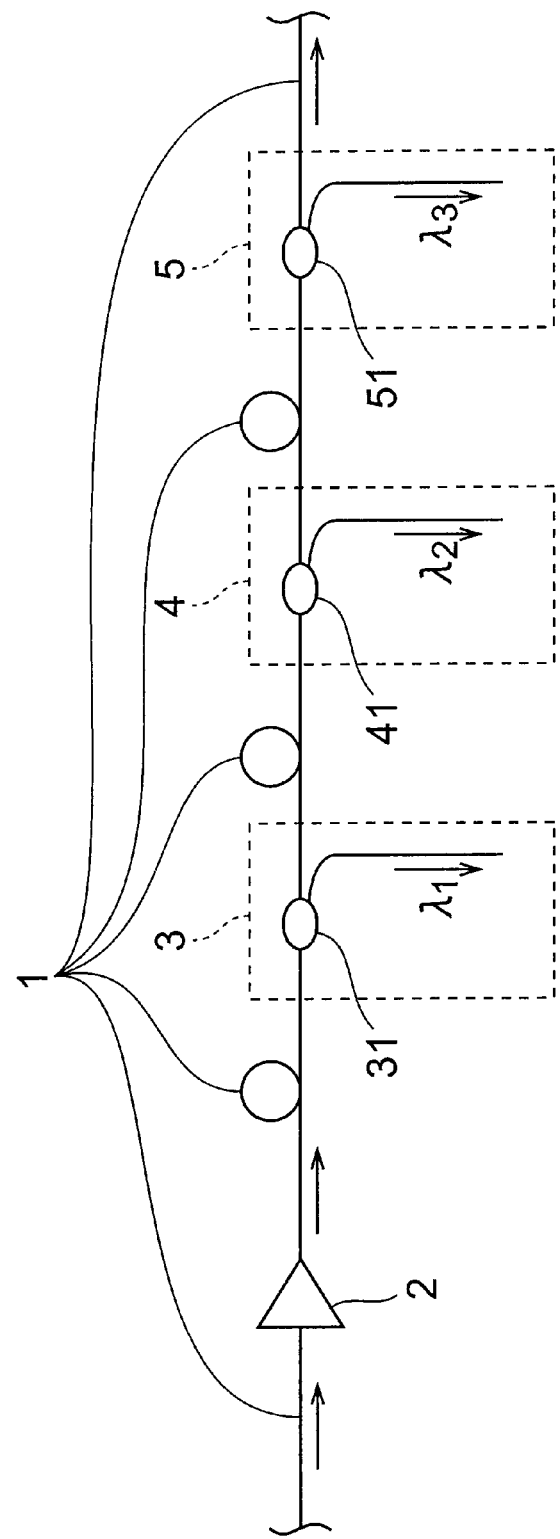
FIG. 1 is a diagram to show the structure of the first embodiment of the optical transmission system according to the present invention.

The optical transmission system and channel assigning method according to the present invention will be described hereinafter in detail with reference to FIGS. 1 to 3, FIG. 4A, FIG. 4B, and FIGS. 5 to 9. In the description of the drawings the same elements will be denoted by the same reference symbols and redundant description will be omitted. It is also noted that dimensional ratios in the drawings do not always match with those in the description.

FIG. 1 is a diagram to show the structure of the first embodiment of the optical transmission system according to the present invention. This optical transmission system is a WDM transmission system through which WDM signals included in a predetermined wavelength band (signals of multiple channels having mutually different wavelengths)

are transmitted, and is comprised of an optical transmission line 1 consisting of optical fiber lines. An EDFA (Er-doped fiber amplifier) 2 as an optical amplifier is installed on the optical transmission line 1, for compensating for transmission losses of WDM signal light to be transmitted.

This optical transmission system is a multidrop system for successively adding or dropping part of the WDM signals propagating in the optical transmission line 1 at every node (signal add point or signal drop point). In the optical transmission system illustrated in FIG. 1, node 3, node 4, and node 5 as dropping stations (child stations) are set in the order named from the one proximate to the EDFA 2 on the downstream transmission line 1 connected to the output terminal of the EDFA 2.

The node 3 includes a signal branchpoint 31. This signal branchpoint 31 is preliminarily set to drop a signal of a wavelength $\lambda 1$. Thus the signal branchpoint 31 drops the signal of the wavelength $\lambda 1$ out of the WDM signals having been amplified by the EDFA 2 and having propagated in the transmission line 1. Each of the nodes 4, 5 also includes a signal branchpoint 41 or 51 preliminarily set to drop a signal of a wavelength $\lambda 2$ or $\lambda 3$, respectively. These wavelengths $\lambda 1$ to $\lambda 3$ are set as respective signal channels of different wavelengths. Specific construction and others of the signal branchpoints 31 to 51 will be described hereinafter.

Figure 2:
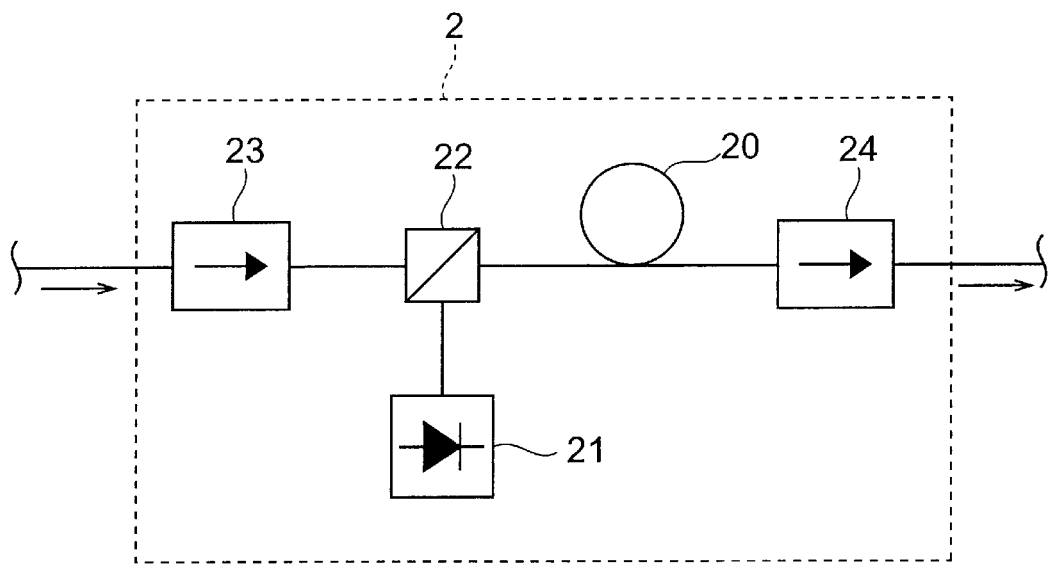
FIG. 2 is a diagram to show the structure of an example of the Er-doped fiber amplifier as an optical amplifier.

FIG. 2 is a diagram to show the structure of an example of the EDFA 2 applied as an optical amplifier in the WDM optical transmission system of the first embodiment illustrated in FIG. 1.

This EDFA 2 is provided with an EDF (Er-doped optical fiber) 20, a pumping source 21, a WDM coupler 22, and two optical isolators 23, 24. The EDF 20 is a silica-based optical fiber doped with Er and amplifies light of wavelengths included in an amplification wavelength band with supply of pumping light of a predetermined wavelength.

Each of the optical isolators 23, 24 is an optical device, that allows light to pass forward but does not allow light to pass backward. Namely, the optical isolator 23 allows the WDM signals entering the EDFA 2 to pass toward the EDF 20, but does not allow them to pass backward. The optical isolator 24 also allows the WDM signals from the EDF 20 to pass toward the outside of the EDFA 2, but does not allow them to pass backward.

The pumping source 21 supplies the pumping light to the EDF 20. The pumping source 21 is coupled through the WDM coupler 22 to the optical fiber line. Here the WDM coupler 22 guides the pumping light coming from the pumping source 21 to the EDF 20 and also guides the WDM signals coming from the optical isolator 23 to the EDF 20. As constructed in this structure, the EDFA 2 constitutes an optical amplifier of forward pumping (forward excitation).

In the optical transmission system of the first embodiment having the above structure, lengths of optical transmission line 1 (transmission distances) from the output terminal of the EDFA 2 to the signal branchpoints 31 to 51 in the respective nodes 3 to 5 are different from each other. Therefore, there appear differences of transmission losses from the EDFA 2 to dropping among the signals to be dropped at the respective signal branchpoints 31 to 51. Namely, since the transmission loss in the optical transmission line 1 increases with increase in the transmission distance, the transmission loss is the smallest for the signal of the wavelength $\lambda 1$ dropped at the signal branchpoint 31 closest to the EDFA 2. Then the transmission loss increases in the following order; the signal of the wavelength $\lambda 2$ dropped at the signal branchpoint 41 and the signal of the wavelength $\lambda 3$ dropped at the signal branchpoint 51. Thus, the power levels of the signals immediately before dropping decrease in the order of the signal branchpoints 31, 41, and 51.

On the other hand, the EDFA 2, which is an optical amplifier for amplifying these signals of the wavelengths $\lambda 1$ to $\lambda 3$, demonstrates the wavelength dependence of amplification gain. Namely, since gains differ depending upon wavelengths of signals to be amplified, power levels of output signals at the output terminal of the EDFA 2 differ depending upon the signal wavelengths.

As apparent from the above, the signal power levels dropped at the respective nodes 3 to 5 are affected each by two factors, the gain curve exhibiting the wavelength dependence of amplification gain in the EDFA 2 (the power levels of output signals resulting from amplification, at the output terminal) and the transmission distances from the EDFA 2 to the signal branchpoints 31 to 51. At this time there would appear dispersion of power levels among the signals dropped at the respective nodes 3 to 5. Particularly, the dispersion of power levels among the dropped signals would be enhanced depending upon combination of the gain curve with the transmission distances, resulting in considerable degradation of WDM transmission characteristics in the optical transmission system and reception characteristics at receiver stations.

Since increase in the number of nodes also increases the number of signal channels necessary for the WDM transmission, it becomes necessary to employ an optical amplifier with a broader amplification band as the optical amplifier of EDFA 2 or the like applied to the optical transmission system, with increase in the number of signal channels. In this case, particularly, gain change becomes great in the amplification wavelength band of the optical amplifier, so as to intensify the effect of the gain curve on the power levels at the respective signal wavelengths. It is difficult to overcome the dispersion of power levels at the respective signal wavelengths with sufficient accuracy by adjusting the gain curve of the optical amplifier. If a configuration for control of gain is added to the optical amplifier it will complicate the structure of the optical transmission system and increase the manufacturing cost.

In contrast with it, the optical transmission system according to the present invention is configured to assign branch channels to the respective nodes in such a manner that a signal with a smallest power level out of arriving signals is sequentially dropped at each of the signal branchpoints (the nodes as branch stations) installed on the output side (on the downstream side) of the optical amplifier on the optical transmission line.

Figure 3:
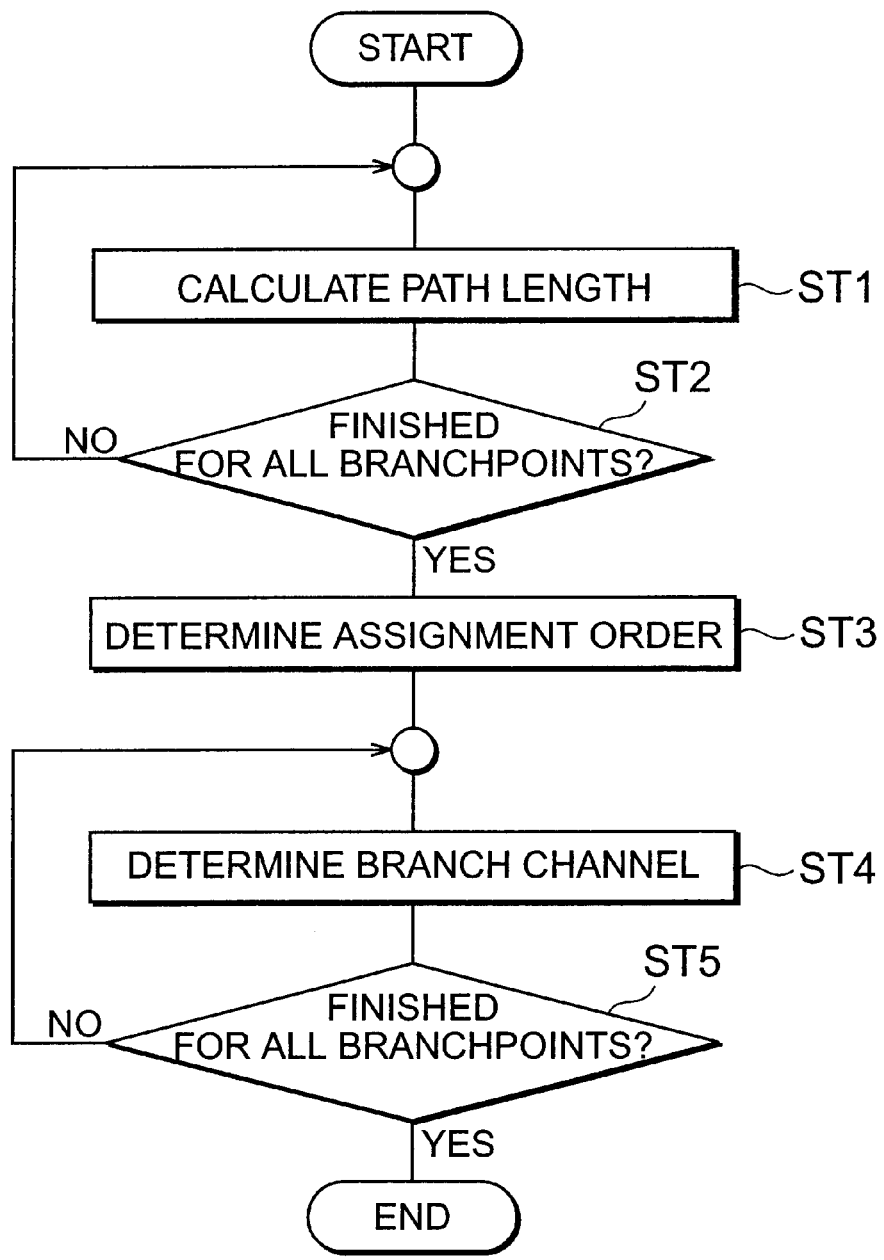
FIG. 3 is a flowchart for explaining the channel assigning method according to the present invention.
Figure 4A:
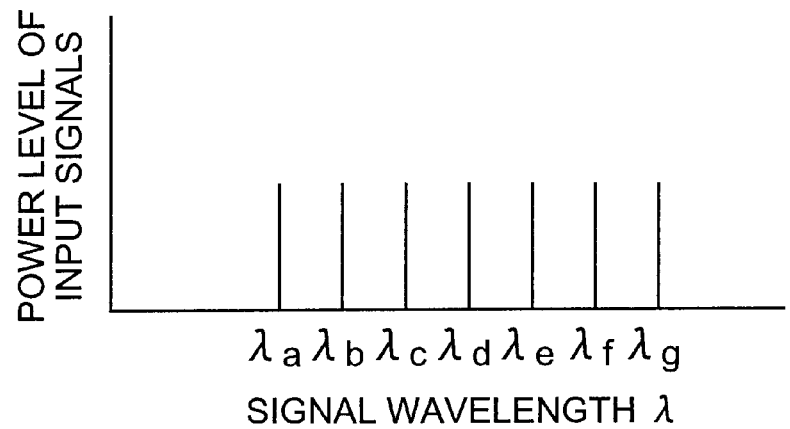
FIG. 4A and FIG. 4B are signal spectrums before and after amplification, for explaining the signal amplification by the EDFA.
Figure 4B:
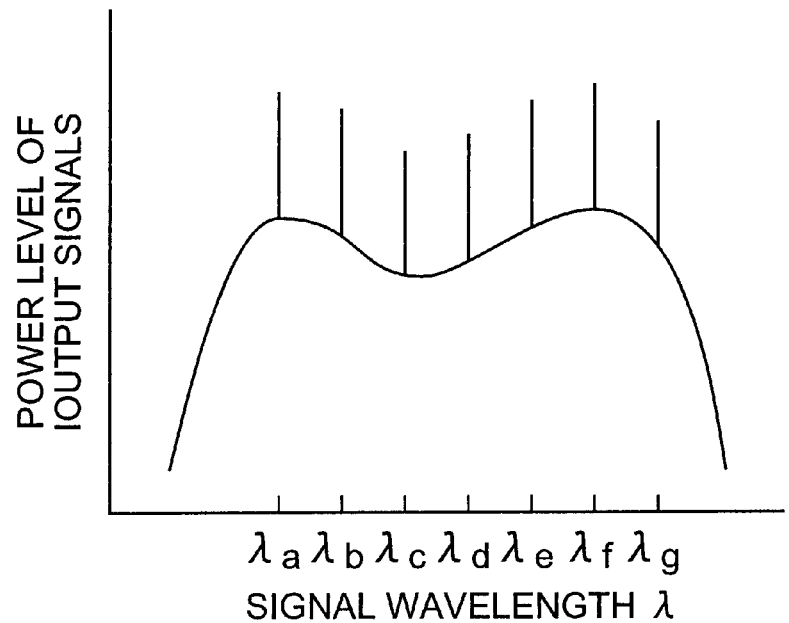

Now the assigning method of the branch channels in the optical transmission system will be specifically described referring to FIG. 1 and using the flowchart of FIG. 3 and the graphs of FIGS. 4A and 4B. It is assumed in the following description that transfer paths of the signals outputted from the optical amplifier are known as illustrated in FIG. 1. In FIG. 4A and FIG. 4B the axis of abscissa of each graph indicates the signal wavelength $\lambda$. Among the input signal levels (power levels of input signals) and the output signal levels (power levels of output signals), the power levels of the output signals amplified by the EDFA 2 are equivalent to power levels resulting from addition of the amplified signal components and a noise component appearing in the optical amplifier.

Let us suppose that 7-channel signals of the wavelengths $\lambda a$ to $\lambda g$ are entered into the EDFA 2, as illustrated in FIG.

4A. At this time, for example, the output signals as illustrated in FIG. 4B are outputted as amplified light from the output terminal of the EDFA 2, because of the gain curve (wavelength dependence of gain) of the EDFA 2. In this example, the power levels of the above 7-chennel output signals are in an order of the signal wavelengths λc, λd, λg, λb, . . . from the smallest. The output signals from this EDFA 2 propagate with their power levels almost uniformly attenuating as a whole due to the transmission losses in the optical transmission line 1 connected to the output terminal of the EDFA 2.

Assignment of the branch channels to the respective nodes 3 to 5 is implemented according to the flowchart of FIG. 3; the distances are first calculated from the EDFA 2 to each of the nodes 3 to 5 (steps ST1, ST2) and the order of assignment is determined from the node of the shortest distance thus calculated (step ST3). In the structure of FIG. 1, since the node 3 is closest to the EDFA 2, the branch channels are assigned to the node 3, the node 4, and the node 5 in the order named.

For example, concerning the wavelength dependence of power levels illustrated in FIG. 4B, the wavelengths λ1, λ2, and λ3 of the signals dropped at the signal branchpoint 31, at the signal branchpoint 41, and at the signal branchpoint 51 are set to λc, λd, and λg, respectively (steps ST4, ST5). Namely, a signal with a smallest power level out of arriving signals (separable signals which are not dropped at other preceding branchpoints) is selected at each of the signal branchpoints 31 to 51. At this time, the wavelength λc of the signal with the smallest power level is selected as the signal wavelength λ1 to be dropped at the signal branchpoint 31 closest to the EDFA 2, and the wavelengths λd, λg are further selected in order from the smallest power level as the wavelengths λ2, λ3.

On the other hand, from the positional relation between the EDFA 2 and the signal branchpoints 31 to 51, the transmission distance of each signal after output from the EDFA 2 is the smallest for the signal of the wavelength λ1 and increases in order for the wavelengths λ2 and λ3, as illustrated in FIG. 1. For that reason, the transmission loss of each signal before dropping at the signal branchpoints 31 to 51 is the smallest for the signal of the wavelength λ1 and increases in order for the wavelengths λ2, λ3. Accordingly, the descending order of magnitudes of transmission losses is the same as the descending order of the power levels of the output signals from the EDFA 2.

In other words, among the signals amplified in the EDFA 2, the signal of the wavelength λc with the smallest power level is dropped at the signal branchpoint 31 closest to the EDFA 2 so as to make the transmission loss before dropping smallest, and the signals are also dropped in order from the signal with the smallest power level at each of the subsequent signal branchpoints 41, 51. This reduces the dispersion of power levels among the signals dropped at the respective nodes 3 to 5 and thus improves the WDM transmission characteristics in the optical transmission system.

The reduction of the dispersion of power levels among signals will be specifically described below using the signals of the wavelengths λc, λd as an example. Suppose the power deviation between the two signals of the wavelengths λc, λd (dispersion of power levels between the two signals) were 1 dB at the output terminal of EDFA 2. Then these signal light beams are dropped at the respective nodes 3, 4 under the setting of λ1=λc and λ2=λd. Therefore, upon dropping of the signal at the signal branchpoint 31, the power level of the signal of the wavelength λd should be 1 dB higher than that of the signal of the wavelength λc.

Then, assuming that the fiber loss is 0.2 dB/km and the fiber length is 5 km for the optical fiber line forming a portion of the optical transmission line 1, which connects the signal branchpoint 31 with the signal branchpoint 41, the transmission loss thereof is calculated as 0.2×5=1 dB. Thus the power level of the signal of the wavelength λd is attenuated by 1 dB during transmission from the signal branchpoint 31 to the signal branchpoint 41. At this time, the power level of the signal of the wavelength λ1=λc dropped at the signal branchpoint 31 becomes equal to the power level of the signal of the wavelength λ2=λd dropped at the signal branchpoint 41.

Let us suppose a reverse case wherein the signal of the wavelength λd is dropped at the signal branchpoint 31 and the signal of the wavelength λc at the signal branchpoint 41. In this case, the power deviation between the dropped signals is 2 dB, so that the dispersion of power levels between the signals becomes greater than that at the output terminal of the EDFA 2. As seen from the above, the dispersion of power levels among signals is effectively canceled or reduced by assignment of the branch channels to the respective nodes 3 to 5 by the channel assigning method according to the present invention. This effect is also similarly valid with further increase in the number of signal channels.

Next, elements suitably applicable to the signal branchpoints 31 to 51 for dropping the respective signals of the wavelengths λ1 to λ3 are, for example, optical ADMs (Add-Drop Multiplexers) (a first application example of the signal branchpoints). The optical ADMs demonstrate excellent wavelength selectivity and adequately suppress crosstalk between signal channels even if wavelength spacings are narrow.

Figure 5:
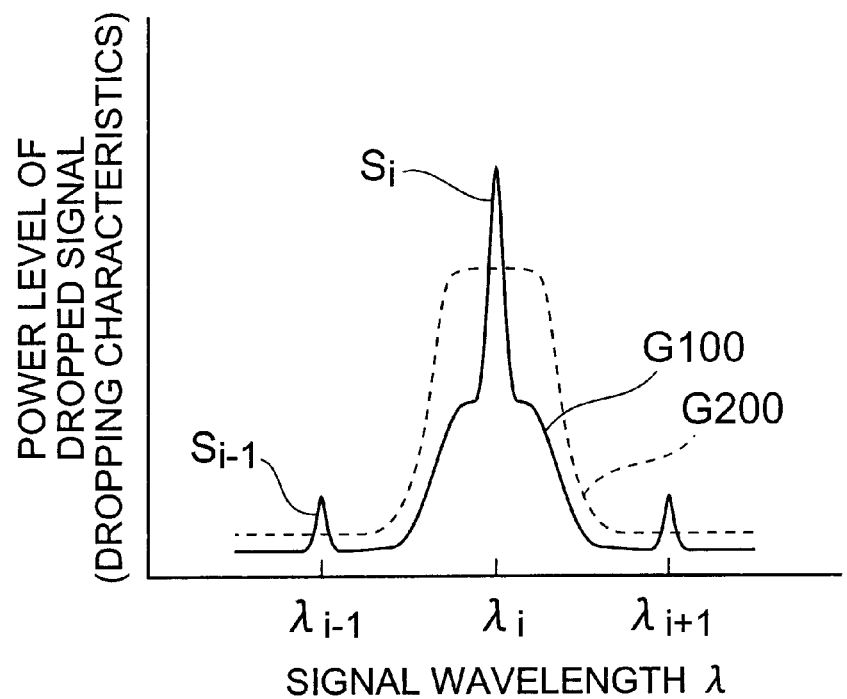
FIG. 5 is a signal spectrum for explaining signal dropping by the optical ADM applied to a node according to a first application example.

FIG. 5 is a signal spectrum for explaining the signal dropping characteristics of the optical ADM applied to each node according to the first application example. In the figure G200 represents the dropping characteristics of the optical ADM applied as a signal branchpoint (drop port characteristics upon input of a flat power signal) and G100 a spectrum of an actually dropped signal. FIG. 5 shows a case in which the signal of the wavelength $\lambda_1$ is dropped, and it is seen from this spectrum that the optical ADM has the narrow drop wavelength band and realizes the excellent wavelength selectivity. The width of an actual drop wavelength band is, for example, approximately 0.4 nm and can also be narrowed to a bandwidth narrower than it.

FIG. 5 also shows another signal of wavelength $\lambda_{1-1}$ as a signal of an adjacent channel, and an extinction ratio, which is a ratio of power levels of the signal $S_i$ of the channel to be dropped and the signal $S_{1-1}$ of the adjacent channel, can be made larger than 30 dB. Thus signal dropping can be implemented with adequately suppressing the crosstalk between the signal channels.

Figure 6:
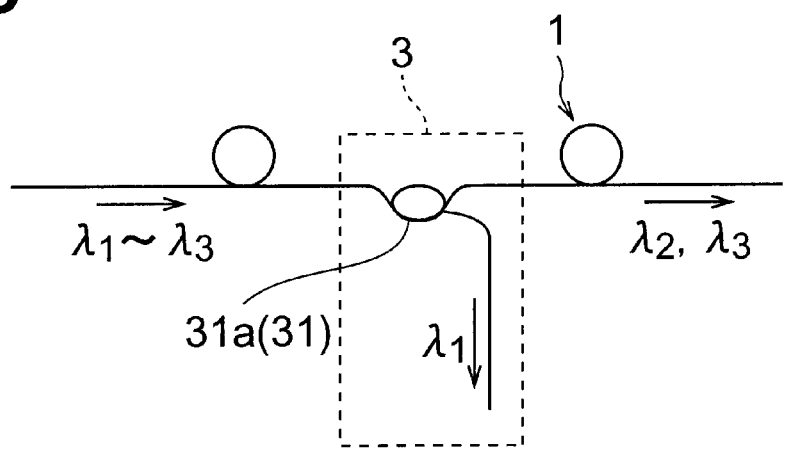
FIG. 6 is a diagram to show a configuration of a node according to a second application example.

Each signal branchpoint may include a WDM coupler in place of the above optical ADM. FIG. 6 is a figure to show the structure of the node 3 including the signal branchpoint 31 provided with the WDM coupler, as a second application example. The nodes 4, 5 may also have the same structure. The signal branchpoint 31 at the node 3 according to the second application example is provide with the WDM coupler 31a for dropping the signal of the wavelength λ1 from the optical transmission line 1. The WDM coupler is inexpensive, compact, and easy to handle, and less attenuates signals. When the WDM coupler with excellent filter characteristics is applied, the crosstalk can also be kept low between signal channels.

Figure 7:
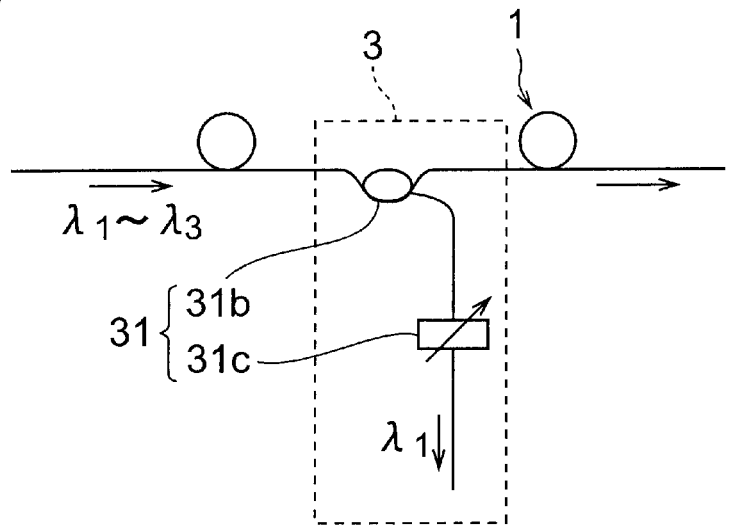
FIG. 7 is a diagram to show a configuration of a node according to a third application example.

Further, each signal branchpoint can also be constructed using an optical coupler and a band-pass filter. FIG. 7 is a diagram to show the structure of the node 3 including the signal branchpoint 31 provided with the optical coupler and the band-pass filter, as a third application example. The nodes 4, 5 may also have the same structure. The signal branchpoint 31 at the node 3 according to this third application example is provided with the optical coupler 31b (for example, a 3 dB optical coupler) for separating part of signals propagating in the transmission line and the band-pass filter 31c for selectively transmitting only the signal of the wavelength λ1 included in the separated part of the signals. Since the optical coupler is inexpensive, compact, and easy to handle, it is particularly effective to cases wherein the number of signal channels is not so large and the system configuration is desired to be made simple in particular.

The band-pass filter 31c of FIG. 7 is illustrated as a tunable band-pass filter, and the application of the tunable band-pass filter in this way can increase degrees of freedom for system modification. In the case of the signal branchpoint provided with the optical coupler and band-pass filter as described (the third application example), it is necessary to pay attention to loss in the optical coupler, and it should be contemplated to add another optical amplifier into the optical transmission line 1 in certain cases.

Figure 8:
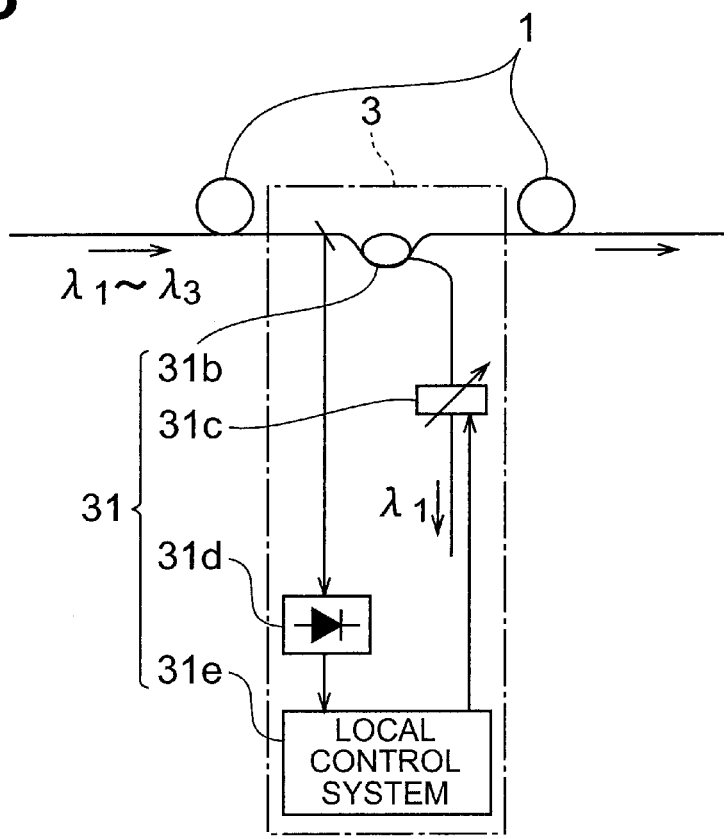
FIG. 8 is a diagram to show a configuration of a node according to a fourth application example.

When each of the signal branchpoints 31 to 51 comprises the band-pass filter of the wavelength tunable type, it is feasible to select branch channels at the respective signal branchpoints or to implement centralized control of assignment of branch channels to the respective signal branchpoints (dynamic assignment of branch channels). Particularly, FIG. 8 shows the structure of the node 3 that has the signal branchpoint of the structure similar to that illustrated in FIG. 7 and that is capable of individual assignment of branch channel, as a fourth application example. The nodes 4, 5 may also have the same structure.

In the node 3 according to the fourth application example illustrated in FIG. 8, the signal branchpoint 31 is provided with a photoreceptive device 31d for monitoring power levels of signals arriving at the node 3, and a local control system 31e for selecting a branch channel at the node 3, in addition to the optical coupler 31b and the tunable band-pass filter 31c.

The local control system 31e executes the step ST4 in the flowchart illustrated in FIG. 3 to control the tunable band-pass filter 31c. Namely, the local control system 31e monitors the power levels of the arriving signals in the respective channels by use of the photoreceptive device 31d and specifies a channel with a smallest power level out of the channels, as a channel of a signal to be dropped (step ST4). Then the local control system controls the tunable band-pass filter 31c so as to allow only the signal of the channel thus specified, to pass.

Figure 9:
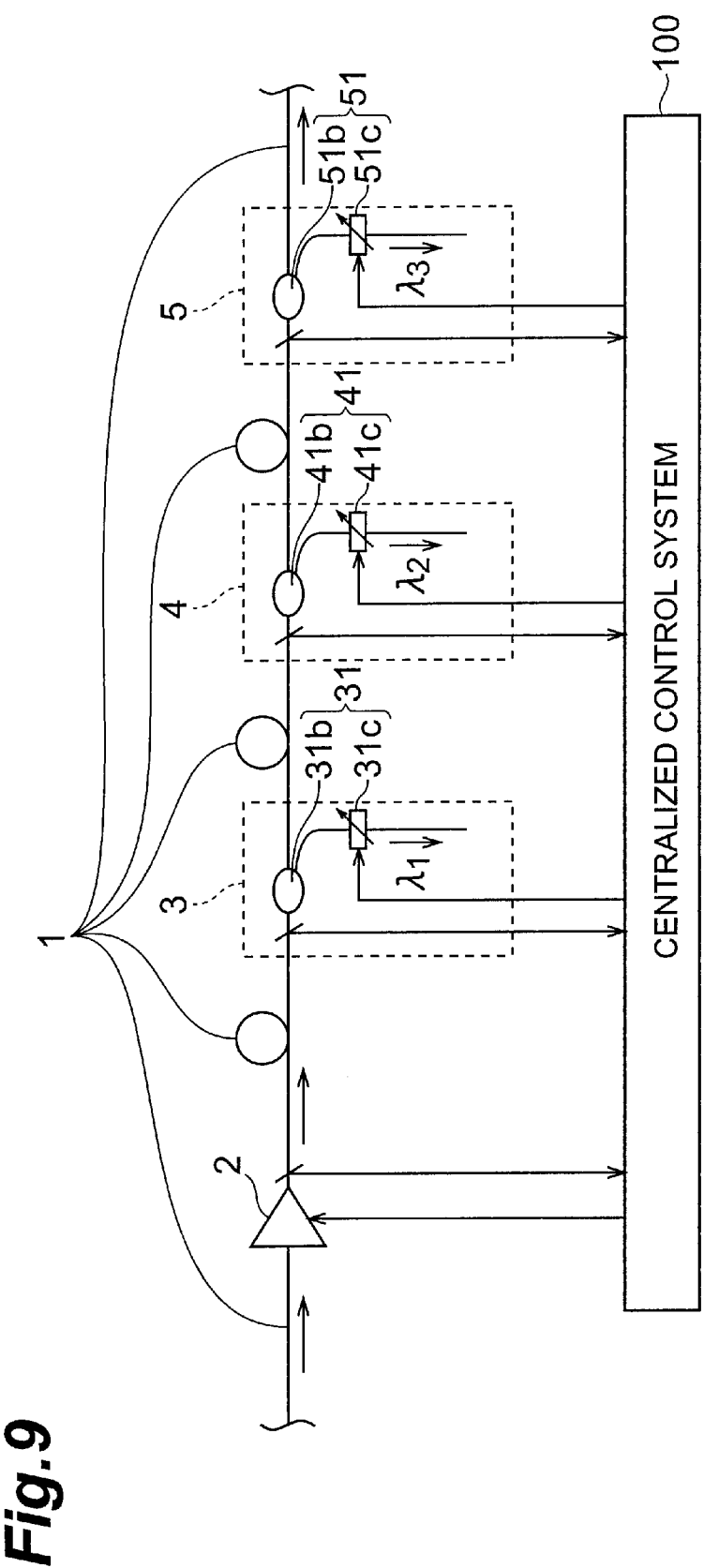
FIG. 9 is a diagram to show the structure of the second embodiment of the optical transmission system according to the present invention.

FIG. 9 is a diagram to show the structure of the second embodiment of the optical transmission system according to the present invention. For assigning the branch channels to the respective signal branchpoints 31 to 51, the optical transmission system according to the second embodiment is provided with a centralized control system 100 for assigning the channels to be dropped, to the respective signal branchpoints while monitoring power levels of arriving signals in the respective channels at each of the signal branchpoints 31 to 51.

This centralized control system 100 performs the assignment of the branch channels to the respective signal branchpoints 31 to 51 basically in accordance with the flowchart illustrated in FIG. 3. Namely, the centralized control system 100 determines an assignment order of branch channels from the shortest distance with respect to the optical amplifier 2 to select each signal branchpoint as a control objective from the signal branchpoints 31 to 51 (steps ST1 to ST3). In the configuration illustrated in FIG. 9 the assignment objects are determined in the order of the node 3, the node 4, and the node 5, but this assignment order may also be set to the descending order of power levels of signals arriving at the respective nodes 3 to 5. In the next step, the centralized control system 100 specifies a channel with a lowest power level out of the plural channels, as a branch channel for the signal branchpoint 3 to which a first branch channel is to be assigned (step ST4). This assignment operation is repeated for the node 4 and the node 5 in the order named (step ST5).

The optical transmission system and channel assigning method according to the present invention are not limited to the above-stated embodiments, and they can be subject to various changes in the structure and setting. For example, as to the signal wavelengths of the signals dropped at the nodes 3 to 5, the wavelengths λ1, λ2, and λ3 were set to λc, λd, and λg, respectively, corresponding to the power levels of the output signals (or the gain curve of the optical amplifier) in the example illustrated in FIG. 4A and FIG. 4B, but with another different wavelength dependence of the gain curve, these signal wavelengths have to be set corresponding to each wavelength dependence. The signal branchpoints 31 to 51 may be constructed by applying branching devices except for the optical ADM, the WDM coupler, and the optical coupler and band-pass filter. When signals of plural channels are dropped at one node, the system can be constructed so that a signal of one channel out of the branch channels is of a lowest power level.

In the optical transmission system illustrated in FIG. 1, the EDFA 2 is used as an optical amplifier. The EDFA normally demonstrates the wavelength dependence having gain peaks around 1535 nm and around 1558 nm (corresponding to the two-peak structure illustrated in FIG. 4B), and, for example, it is also possible to assign signals near the middle wavelength 1542 nm between those two wavelengths to the nodes close to the output terminal of the EDFA and assign signals near the peak wavelengths to the far nodes.

Since this assignment of the branch channels can utilize the wavelength dependence of the optical amplifier as it is, without flattening or sloping the gain curve of the optical amplifier, it becomes feasible to reduce the dispersion of the power levels of the branch signals at the respective nodes or dispersion of reception levels at respective receiver stations while adequately reducing the manufacturing cost of the entire optical transmission system and thus to improve the WDM transmission characteristics. The optical amplifier can also be selected from the optical amplifiers except for the EDFA. The optical amplifiers applicable are, for example, optical amplifiers including optical fibers doped with rare earth elements such as Tm, Pr, Nd, or the like, semiconductor optical amplifiers, and so on.

According to the present invention, as described above, the branch channels are preliminarily or dynamically set so as to drop a signal with a smallest power level out of arriving signals at each of the signal branchpoints installed on the optical transmission line located on the output side of the optical amplifier. This structure reduces the dispersion of power levels among the signals dropped at the respective signal branchpoints. Since the present invention does not require addition of a device configuration for flattening or sloping the gain curve (wavelength dependence of gain) to the optical amplifier, the dispersion of power levels among dropped signals is reduced by positively making use of the wavelength dependence of the gain curve, without complicating the system configuration. Accordingly, the WDM transmission characteristics are improved with keeping the manufacturing cost of the system low.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission system comprising:
   an optical transmission line in which signals of multiple channels having mutually different wavelengths included in a predetermined wavelength band propagate;
   an optical amplifier disposed on said optical transmission line and having a gain depending on wavelength; and
   a plurality of signal branchpoints disposed on an output terminal side of said optical amplifier in said optical transmission line;
   wherein each of said plurality of signal branchpoints drops a signal of a channel with a lowest power level out of the signals of said channels arriving thereat.

2. An optical transmission system according to claim 1, wherein each of said plurality of signal branchpoints includes a WDM coupler.

3. An optical transmission system according to claim 1, wherein each of said plurality of signal branchpoints includes an optical ADM.

4. An optical transmission system according to claim 1, wherein each of said plurality of signal branchpoints includes an optical coupler and a band-pass filter.

5. An optical transmission system according to claim 1, wherein each of said plurality of signal branchpoints includes a local control system for monitoring power levels of arriving signals in said respective multiple channels and specifying a channel with a lowest power level out of the channels, as a channel of a signal to be dropped.

6. An optical transmission system according to claim 1, further comprising:
   a centralized control system for assigning channels to be dropped, to the respective signal branchpoints while monitoring power levels of arriving signals in said respective multiple channels at each of said plurality of signal branchpoints, wherein said centralized control system selects a signal branchpoint as a control objective out of said plurality of signal branchpoints and specifies, for every signal branchpoint selected, a channel with a lowest power level out of said multiple channels, as a channel of a signal to be dropped at said signal branchpoint selected.

7. An optical transmission system according to claim 1, wherein said optical amplifier includes an Er-doped fiber amplifier.

8. A channel assigning method of assigning channels to be dropped, to respective signal branchpoints placed on an optical transmission line in which signals of multiple channels outputted from an optical amplifier propagate, said channel assigning method comprising the following steps:
   successively selecting one out of said plurality of signal branchpoints;
   specifying a channel with a lowest power level out of said multiple channels, for every said selected signal channel thus selected; and
   assigning the channel thus specified, to said selected signal branchpoint, as a channel of a signal to be dropped.

* * * * *